United States Patent
Kim et al.

(10) Patent No.: US 10,599,363 B2
(45) Date of Patent: Mar. 24, 2020

(54) NONVOLATILE MEMORY CAPABLE OF OUTPUTTING DATA USING WRAPAROUND SCHEME, COMPUTING SYSTEM HAVING THE SAME, AND READ METHOD THEREOF

(71) Applicants: Jinwoo Kim, Seoul (KR); Jaegeun Park, Suwon-si (KR); Youngjin Cho, Seoul (KR)

(72) Inventors: Jinwoo Kim, Seoul (KR); Jaegeun Park, Suwon-si (KR); Youngjin Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 409 days.

(21) Appl. No.: 15/398,775

(22) Filed: Jan. 5, 2017

(65) Prior Publication Data

US 2017/0235522 A1 Aug. 17, 2017

(30) Foreign Application Priority Data

Feb. 11, 2016 (KR) ........................ 10-2016-0015759

(51) Int. Cl.
```
G06F 3/06        (2006.01)
G06F 11/10       (2006.01)
G06F 13/28       (2006.01)
G06F 12/0831     (2016.01)
G06F 12/0868     (2016.01)
G06F 12/0879     (2016.01)
```
(52) U.S. Cl.
CPC .......... *G06F 3/0659* (2013.01); *G06F 3/0619* (2013.01); *G06F 3/0685* (2013.01); *G06F 11/1008* (2013.01); *G06F 11/1064* (2013.01); *G06F 12/0835* (2013.01); *G06F 12/0868* (2013.01); *G06F 13/28* (2013.01); *G06F 12/0879* (2013.01); *G06F 2212/1021* (2013.01); *G06F 2212/214* (2013.01); *G06F 2212/22* (2013.01); *G06F 2212/60* (2013.01); *G06F 2212/621* (2013.01)

(58) Field of Classification Search
None
See application file for complete search history.

(56) References Cited

U.S. PATENT DOCUMENTS 4,912,631 A * 3/1990 Lloyd ................ G06F 12/0879
711/118
5,222,046 A 6/1993 Kreifels et al.
(Continued)

*Primary Examiner* — Justin R Knapp
(74) *Attorney, Agent, or Firm* — Volentine, Whitt & Francos, PLLC

(57) ABSTRACT

A read method executed by a computing system includes a processor, at least one nonvolatile memory, and at least one cache memory performing a cache function of the at least one nonvolatile memory. The method includes receiving a read request regarding a critical word from the processor. A determination is made whether a cache miss is generated, through a tag determination operation corresponding to the read request. Page data corresponding to the read request is received from the at least one nonvolatile memory in a wraparound scheme when a result of the tag determination operation indicates that the cache miss is generated. The critical word is output to the processor when the critical word of the page data is received.

19 Claims, 17 Drawing Sheets

(56) References Cited

U.S. PATENT DOCUMENTS

| | | | |
|---|---|---|---|
| 5,668,975 | A | 9/1997 | Coddington |
| 5,845,308 | A * | 12/1998 | Dockser ............... G06F 12/0862 |
| | | | 711/3 |
| 5,956,743 | A | 9/1999 | Bruce et al. |
| 6,272,601 | B1 | 8/2001 | Nunez et al. |
| 7,679,133 | B2 | 3/2010 | Son et al. |
| 7,743,202 | B2 | 6/2010 | Tsai et al. |
| 7,765,359 | B2 | 7/2010 | Kang et al. |
| 8,458,406 | B2 | 6/2013 | Biswas et al. |
| 8,553,466 | B2 | 10/2013 | Han et al. |
| 8,559,235 | B2 | 10/2013 | Yoon et al. |
| 8,654,587 | B2 | 2/2014 | Yoon et al. |
| 8,713,277 | B2 | 4/2014 | Lilly et al. |
| 8,959,307 | B1 | 2/2015 | Bruce et al. |
| 2004/0143710 | A1 * | 7/2004 | Walmsley ............ B41J 2/04505 |
| | | | 711/144 |
| 2011/0167204 | A1 | 7/2011 | Estakhri et al. |
| 2011/0233648 | A1 | 9/2011 | Seol et al. |
| 2014/0095800 | A1 * | 4/2014 | Biswas ............... G06F 12/0842 |
| | | | 711/135 |

* cited by examiner

NONVOLATILE MEMORY CAPABLE OF OUTPUTTING DATA USING WRAPAROUND SCHEME, COMPUTING SYSTEM HAVING THE SAME, AND READ METHOD THEREOF

CROSS-REFERENCE TO RELATED APPLICATION(S)

This U.S. non-provisional patent application claims priority under 35 U.S.C. § 119 to Korean Patent Application No. 10-2016-0015759 filed on Feb. 11, 2016, in the Korean Intellectual Property Office, the entire contents of which are hereby incorporated by reference.

BACKGROUND

The disclosure relates to a nonvolatile memory outputting data in a wraparound scheme, a computing system including the same, and a read method thereof.

A nonvolatile memory compatible with various interfaces of an existing computing system is being developed. Attempts to use a flash memory as a data storage device or a working memory by mounting the flash memory on the same slot or channel as a main memory (or a working memory) are being made. In this case, compatibility with a conventionally used volatile random access memory (RAM) (e.g., a DRAM) should be considered. There is a need for a technique capable of providing optimum data integrity and a low-power characteristic while maintaining the compatibility with the volatile RAM.

SUMMARY

Embodiments of the disclosure provide a computing system that improves output performance of a critical word and a read method thereof.

One aspect of embodiments of the disclosure is directed to provide a read method of a computing system that includes a processor, at least one nonvolatile memory, and at least one cache memory performing a cache function of the at least one nonvolatile memory. The method includes receiving a read request regarding a critical word from the processor, determining whether a cache miss is generated, through a tag determination operation corresponding to the read request, receiving page data corresponding to the read request from the at least one nonvolatile memory in a wraparound scheme when a result of the tag determination operation indicates that the cache miss is generated, and outputting the critical word to the processor when the critical word of the page data is received.

Another aspect of embodiments of the disclosure is directed to provide a read method of a nonvolatile memory module that includes at least one nonvolatile memory and at least one a dynamic random access memory (DRAM) performing a cache function of the at least one nonvolatile memory. The method includes receiving a read request from a host, determining a cache hit and a cache miss of a cache line of the at least one DRAM corresponding to the read request, filling the cache line with page data, which is output from the at least one nonvolatile memory by using a wraparound operation and which corresponds to the read request, when the cache miss of the cache line is determined, and outputting a critical word corresponding to the read request while filling the cache line with the page data.

Still another aspect of embodiments of the disclosure is directed to provide a computing system that includes a processor configured to issue a read request, at least one cache memory including cache lines, and at least one nonvolatile memory. When there is generated a cache miss indicating that a cache line, which corresponds to the read request, from among the cache lines does not exist, the at least one nonvolatile memory reads page data corresponding to the read request and outputs the read page data by using a wraparound operation. The at least one cache memory fills the cache line with the page data output through the wraparound operation and outputs a critical word of the cache line corresponding to the read request to the processor.

A further aspect of embodiments of the disclosure is directed to provide a nonvolatile memory that includes a plurality of memory blocks having a plurality of pages, a page buffer circuit configured to store page data read from one of the plurality of pages in response to a wraparound read command, and control logic configured to output a first critical word of the page data, which corresponds to an offset, in response to a first output command.

A further aspect of embodiments of the disclosure is directed to provide a method executed by a memory controller. The method includes receiving a read request from a processor and determining whether data identified by the read request exists within a cache memory. In response to determining that the data identified by the read request does not exist within the cache memory, the memory controller instructs a nonvolatile memory to communicate, to the memory controller, the data identified by the read request and other data stored in the same page of the nonvolatile memory as the data identified by the read request so that the data identified by the read request is communicated before any other portion of the page, regardless of the location of the data identified by the read request within the page.

A further aspect of embodiments of the disclosure is directed to provide a memory module that includes a cache memory, a nonvolatile memory, and a memory controller. The memory controller receives a read request from a processor and determines whether data identified by the read request exists within the cache memory. In response to determining that the data identified by the read request does not exist within the cache memory, the memory controller instructs the nonvolatile memory to communicate, to the memory controller, the data identified by the read request and other data stored in the same page of the nonvolatile memory as the data identified by the read request so that the data identified by the read request is communicated before any other portion of the page, regardless of the location of the data identified by the read request within the page.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
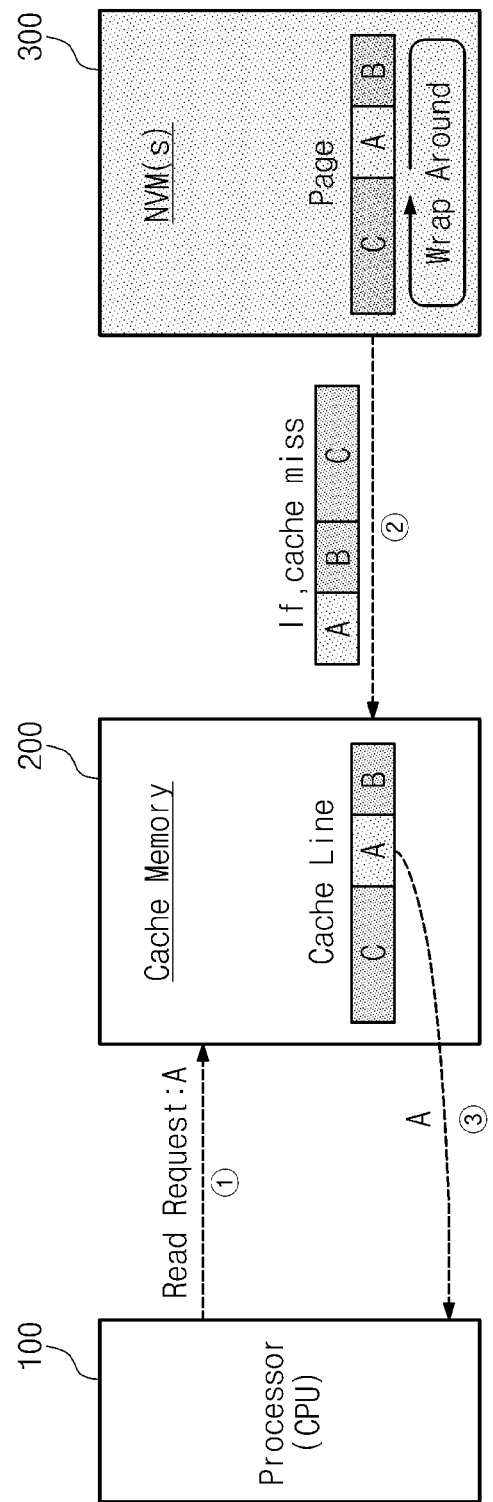
FIG. 1 is a block diagram illustrating a computing system according to an embodiment of the disclosure.

The present disclosure will be described more fully hereinafter with reference to the accompanying drawings, in which exemplary embodiments of the disclosure are shown. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

FIG. 1 is a block diagram illustrating a computing system 10 according to an embodiment of the disclosure. Referring to FIG. 1, the computing system 10 may include a processor 100, a cache memory 200, and a nonvolatile memory 300.

In an embodiment, the computing system 10 may be used as a computer, a portable computer, an ultra-mobile personal computer (UMPC), a workstation, a data server, a net-book, a personal digital assistant (PDA), a web tablet, a wireless phone, a mobile phone, a smart phone, an e-book, a portable multimedia player (PMP), a digital camera, a digital audio recorder/player, a digital picture/video recorder/player, a portable game machine, a navigation system, a black box, a 3D television, a device capable of transmitting and receiving information at a wireless circumstance, a wearable device, one of various electronics devices constituting a home network, one of various electronics devices constituting a computer network, one of various electronics devices constituting a telematics network, a radio-frequency identification (RFID), or one of various electronic devices constituting a computing system.

The processor 100 may control an overall operation of the user system 10. For example, the processor 100 may be a central processing unit (CPU), a co-processor, an arithmetic processing unit (APU), a graphic processing unit (GPU), a digital signal processor (DSP), a memory controller hub (MCH), a platform controller hub (PCH), etc. The processor 100 may perform various arithmetic operations of the user system 10 and may process data. Even though not illustrated in FIG. 1, the processor 100 may further include a memory management unit (MMU) for managing the cache memory 200 and the nonvolatile memory 300.

For example, the cache memory 200 may be implemented to perform a cache function of the nonvolatile memory 300. The cache memory 200 may be implemented to include a plurality of cache lines. In an embodiment, the size of a cache line may correspond to that of data for managing data of the nonvolatile memory 300, for example, page data. In an embodiment, the cache memory 200 may be implemented with a volatile memory such as a dynamic random access memory (DRAM) and a static random access memory (SRAM).

Furthermore, the cache memory 200 may be implemented to store a tag corresponding to cache data or to determine whether a cache hit or miss is generated.

The nonvolatile memory 300 may be implemented to include a plurality of pages in which cache data is stored. The nonvolatile memory 300 may be a NAND flash memory, a vertical NAND flash memory (VNAND), a NOR flash memory, a resistive random access memory (RRAM), a phase change memory (PRAM), a magneto-resistive random access memory (MRAM), a ferroelectric random access memory (FRAM), a spin transfer torque random access memory (STT-RAM), a thyristor random access memory (TRAM) or the like.

Furthermore, the nonvolatile memory may be implemented to have a three-dimensional array structure. In an embodiment of the disclosure, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The circuit related on an operation of memory cells may be located in a substrate or on a substrate. The term "monolithic" means that layers of each level of the array are directly deposited on the layers of each underlying level of the array.

In an embodiment of the disclosure, the 3D memory array includes vertical NAND strings that are vertically oriented such that at least one memory cell is located over another memory cell. The at least one memory cell may comprise a charge trap layer. Each vertical NAND string may include at least one select transistor located over memory cells. The at least one select transistor having the same structure with the memory cells and being formed monolithically together with the memory cells.

The three-dimensional memory array is formed of a plurality of levels and has word lines or bit lines shared among levels. The following patent documents, which are hereby incorporated by reference, describe suitable configurations for three-dimensional memory arrays, in which the three-dimensional memory array is configured as a plurality of levels, which is applied by Samsung Electronics Co., with word lines and/or bit lines shared between levels: U.S. Pat. Nos. 7,679,133; 8,553,466; 8,654,587; 8,559,235; and US Pat. Pub. No. 2011/0233648. The nonvolatile memory according to an exemplary embodiment of the disclosure may be applicable to a charge trap flash (CTF) in which an insulating layer is used as a charge storage layer, as well as a flash memory device in which a conductive floating gate is used as a charge storage layer.

Returning to FIG. 1, a critical word of the computing system 10 will be read as follows. Here, the critical word means data of which the size is smaller than that of a cache line. In an embodiment, the size of a critical word may be an integer multiple of the size of an error correction unit. Below, for descriptive convenience, it may be assumed that data of C-A-B is stored in a cache line and the processor 100 requests the cache memory 200 to read the critical word "A" (①).

The cache memory 200 may determine whether a cache hit is generated with respect to cache data corresponding to a read request for the critical word "A", through a tag comparison operation. Here, the tag comparison operation may be performed inside the cache memory 200 or outside the cache memory 200.

The cache hit may mean that a cache line corresponding to the critical word "A" exists. Accordingly, the cache memory 200 may send the critical word "A" to the processor 100 without delay.

The cache miss may mean that no cache line corresponding to the critical word "A" exists. In this case, page data including the critical word "A" may be read from the nonvolatile memory 300, and the read page data may be stored in a cache line of the cache memory 200. The page data of the nonvolatile memory 300 may be stored in the cache line of the cache memory 200 in a wraparound scheme. Here, the wraparound scheme means that page data is filled in the cache memory 200 starting from the requested critical word "A". That is, as illustrated in FIG. 1, data may be sent from the nonvolatile memory 300 to the cache memory 200 in an order of "A", "B", and "C" (②). When the critical word "A" from the nonvolatile memory 300 is stored in the cache line, the cache memory 200 may output the critical word "A" to the processor 100 without delay (③).

The computing system 10 according to an embodiment of the disclosure may fill a cache line in the wraparound scheme, when a cache miss is generated by a read request for the critical word "A", and output the requested critical word "A" to the processor 100 without delay when the cache line is filled with the critical word "A". Accordingly, the computing system 10 according to an embodiment may improve read performance with respect to the critical word "A".

Meanwhile, the computing system 10 may include a memory controller that manages data exchange between the cache memory 200 and the nonvolatile memory 300 illustrated in FIG. 1.

Figure 2:
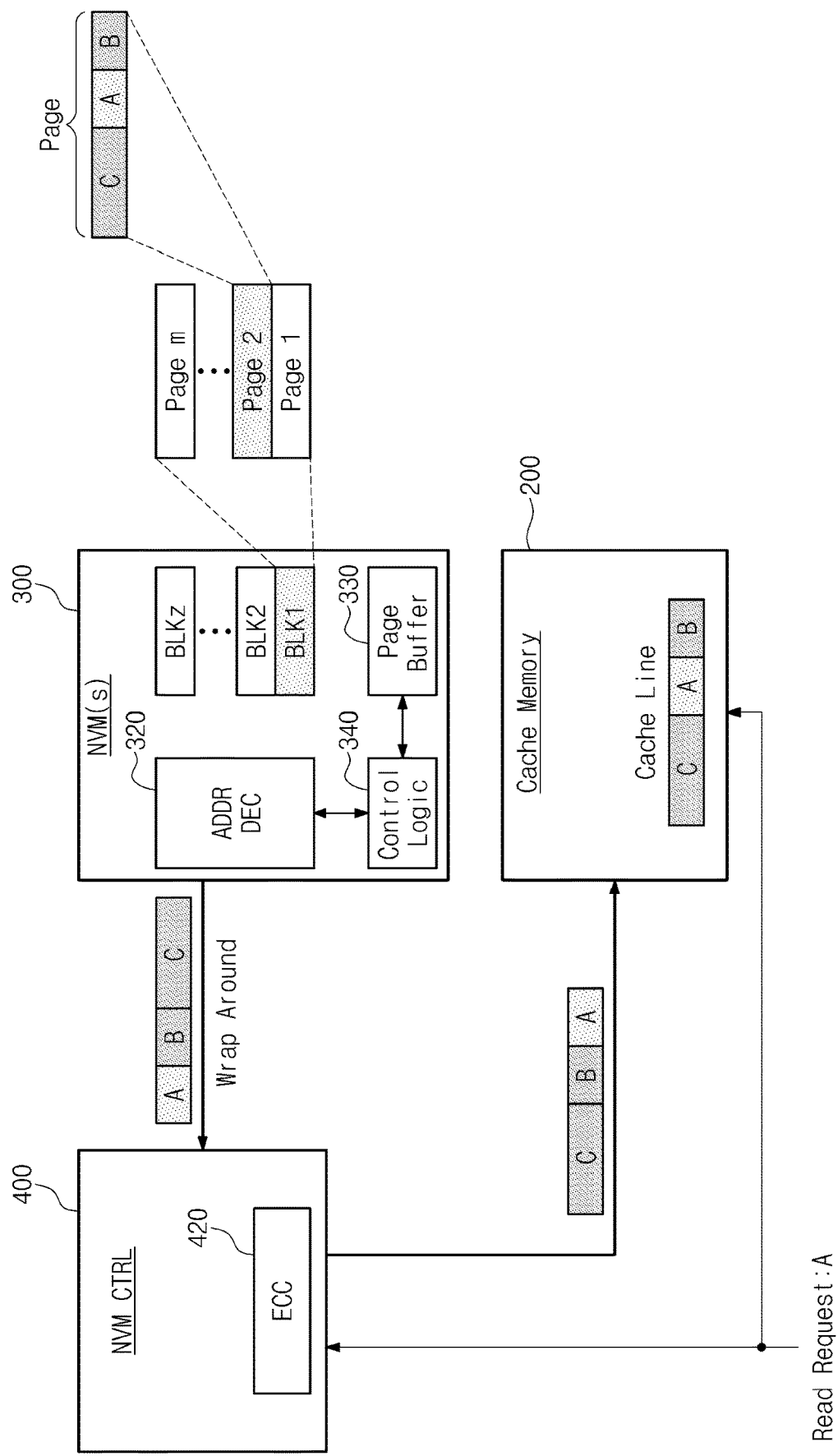
FIG. 2 is a view for describing a process of filling a cache line by using a wraparound scheme according to an embodiment of the disclosure.

FIG. 2 is a view for describing a process of filling a cache line by using a wraparound scheme according to an embodiment of the disclosure. In FIG. 2, a memory controller 400 is illustrated which controls overall operations of the cache memory 200 and the nonvolatile memory 300.

The nonvolatile memory 300 may include a plurality of memory blocks BLK1 to BLKz (z being an integer of 2 or more), an address decoder (ADDR DEC) 320, a page buffer circuit 330, and control logic 340.

Each of the memory blocks BLK1 to BLKz may include a plurality of pages, Page 1 to Page m (m being an integer of 2 or more). For descriptive convenience, an embodiment is illustrated in FIG. 2 in which cache data including a critical word "A" is stored in a second page, Page 2, of the first memory block BLK1.

The address decoder 320 may select one of the plurality of memory blocks BLK1 to BLKz in response to an address, ADDR, received from memory controller 400. The address decoder 320 may be connected to each of the memory blocks BLK1 to BLKz through word lines, at least one string selection line, and at least one ground selection line.

Also, the address decoder 320 may decode a column address of the received address, ADDR. Here, the decoded column address may be provided to the page buffer circuit 330. In an embodiment, the address decoder 320 may include a row decoder, a column decoder, and an address buffer, etc.

The page buffer circuit 330 may be connected to the memory blocks BLK1 to BLKz through a plurality of bit lines. The page buffer circuit 330 may be configured to receive the decoded column address from the address decoder 320. The page buffer circuit 330 may select bit lines based on the decoded column address.

The page buffer circuit 330 may include a plurality of page buffers that store data to be programmed during a program operation or store data read from a selected memory block during a read operation. Here, each of the plurality of page buffers may include a plurality of latches. During the program operation, the data stored in the page buffers may be programmed in a page corresponding to a selected memory block through the selected bit lines. During the read operation, data read from a page of a selected memory block may be stored in the page buffers through the bit lines.

The control logic 340 may be implemented to control overall operations of the nonvolatile memory 300 such as a program operation, a read operation, and an erase operation. The control logic 340 may operate in response to a control signal or a command received from an external device. In particular, the control logic 340 may be implemented to perform the wraparound operation.

Below, the wraparound operation according to an embodiment of the disclosure will be described. When a read operation of a critical word "A" is requested, firstly, whether a cache hit is generated may be determined by performing a tag comparison operation. In an embodiment, whether the cache hit is generated may be performed by the memory controller 400 or by the cache memory 200.

If the tag comparison result indicates that a cache miss is generated, the memory controller 400 may fetch cache data from a page, Page 2, of the nonvolatile memory 300 in the wraparound scheme. In this case, data is read in an order of A, B, and C. Read methods according to the wraparound scheme may be classified into two methods.

The first read method may be a method of sequentially outputting pieces of data "A", "B", and "C" in response to a plurality of commands. The memory controller 400 may send wraparound-based commands to the nonvolatile memory 300 such that pieces of cache data "C", "A", "B" are output for the critical word "A".

The second read method may be a method in which the nonvolatile memory 300 automatically outputs cache data to the memory controller 400 in the wraparound scheme in response to a command of the memory controller 400. The memory controller 400 may send a wraparound read command to the nonvolatile memory 300 such that pieces of cache data "C", "A", and "B" are output for the critical word "A".

The memory controller 400 may perform error correction with respect to pieces of cache data "A", "B", and "C" read in the wraparound scheme, sequentially. The error correction may be performed by an error correction circuit (ECC) 420. The sequentially, error-corrected data "A", "B", and "C" may be sequentially filled within a cache line of the cache memory 200. Here, when the critical word "A" is firstly filled in the cache line, the cache memory 200 may output the critical word "A" to the processor 100 without delay.

Figure 3:
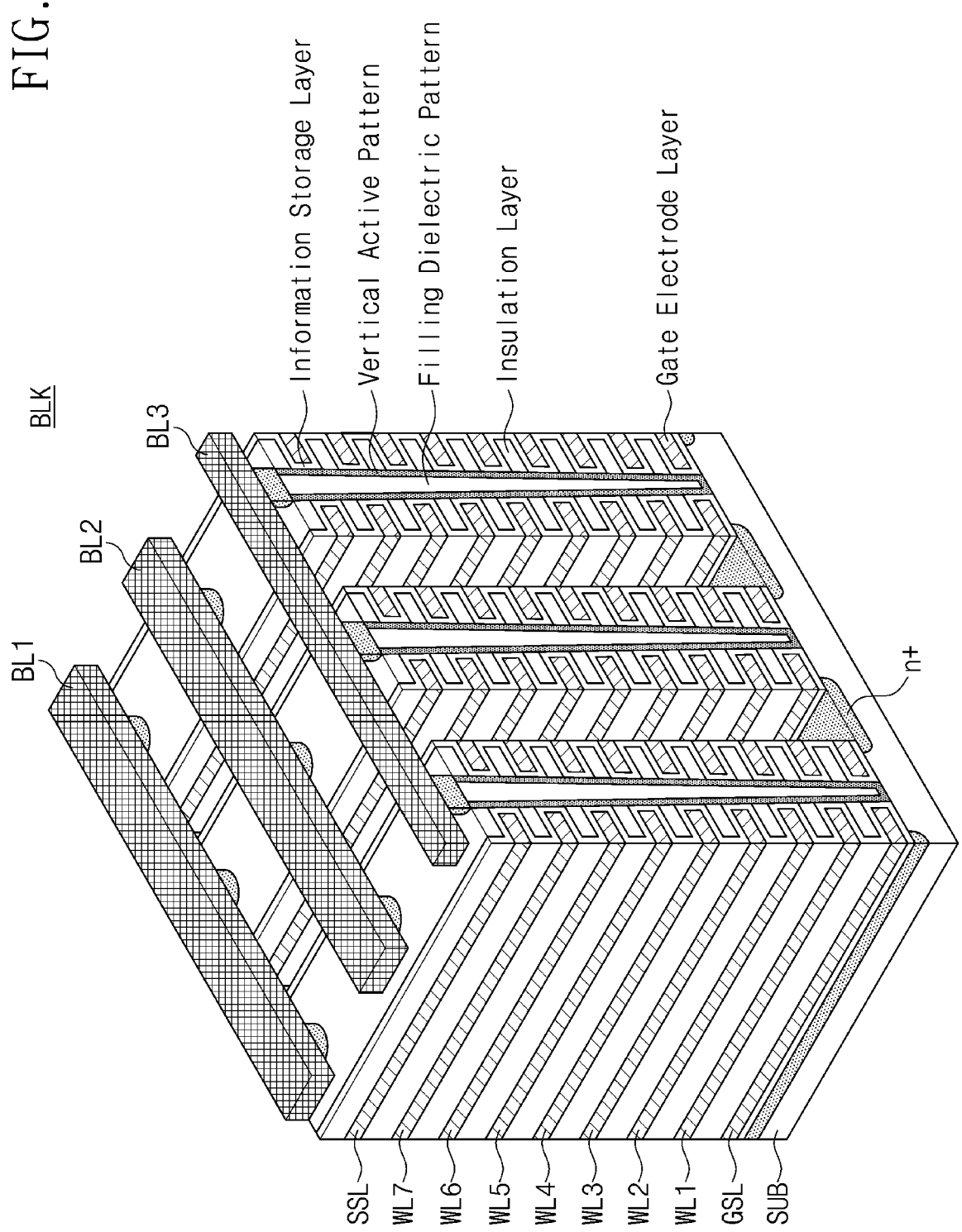
FIG. 3 is a view illustrating a memory block illustrated in FIG. 2.

FIG. 3 is a view illustrating a memory block illustrated in FIG. 2. Referring to FIG. 3, at least one ground selection line GSL, a plurality of word lines WL1 to WL7, and at least one string selection line SSL may be stacked on a substrate SUB in a plate shape. Here, the at least one string selection line SSL may be separated by a string selection line cut. In an embodiment, at least one dummy word line may be stacked between the word lines WL1 to WL7 and the ground selection GSL in a plate shape or may be stacked between the string selection line SSL and the word lines WL1 to WL7. Although not illustrated in FIG. 3, each word line cut includes a common source line CSL. In an embodiment, the common source lines CSL that are respectively included in the word line cuts are connected in common to each other. A string is formed by making a pillar connected to a bit line penetrate the at least one string selection line SSL, the plurality of word lines WL1 to WL7, and the at least one ground selection line GSL.

Seven word lines WL1 to WL7 are illustrated in FIG. 3. However, it should be understood that the number of word lines in a memory block is not limited thereto.

Figure 4:
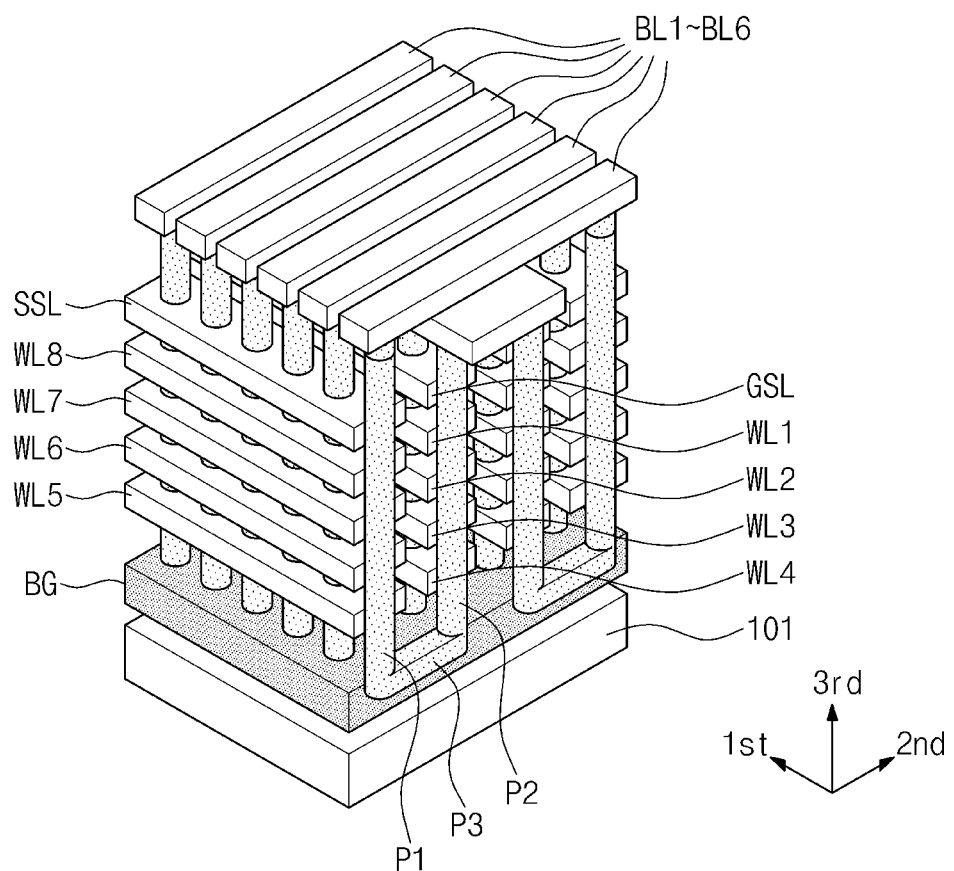
FIG. 4 is a view illustrating another embodiment of a memory block illustrated in FIG. 2.

FIG. 4 is a view illustrating another embodiment of a memory block illustrated in FIG. 2. For descriptive convenience, in FIG. 4, it may be assumed that the number of word line layers included in a memory block BLKb is 4. The memory block BLKb may be implemented with a pipe-shaped bit cost scalable (PBiCS) structure in which lower ends of memory cells, which are adjacent to each other and are connected in series, are connected with a pipe. The memory block BLKb includes m-by-n strings ("m" and "n" being a natural number).

In FIG. 4, "m" is 6, and "n" is 2. Each string includes memory cells that are connected in series. Here, a first upper end of the memory cells is connected to a string selection transistor, and a second upper end thereof is connected to a ground selection transistor, and a lower end thereof is pipe-connected.

Memory cells that constitute a string are formed by stacking a plurality of semiconductor layers. Each string includes a first pillar P1, a second pillar P2, and a pillar connection portion P3 connecting the first pillar P1 and the second pillar P2. A first pillar P1 is formed to be connected to a bit line (e.g., BL1) and the pillar connection portion P3 and to penetrate a string selection line SSL and word lines WL5 to WL8. A second pillar P2 is formed to be connected to a common source line and the pillar connection portion P3 and to penetrate a ground selection line GSL and word lines WL1 to WL4. As illustrated in FIG. 4, a string is implemented in the form of a U-shaped pillar.

In an embodiment, a back-gate BG is formed on a substrate 101, and the pillar connection portion P3 may be formed in the back-gate BG. In an embodiment, the back-gate BG may exist in common in the memory block BLKb. The back-gate BG may be separate from a back-gate of another memory block.

Figure 5:
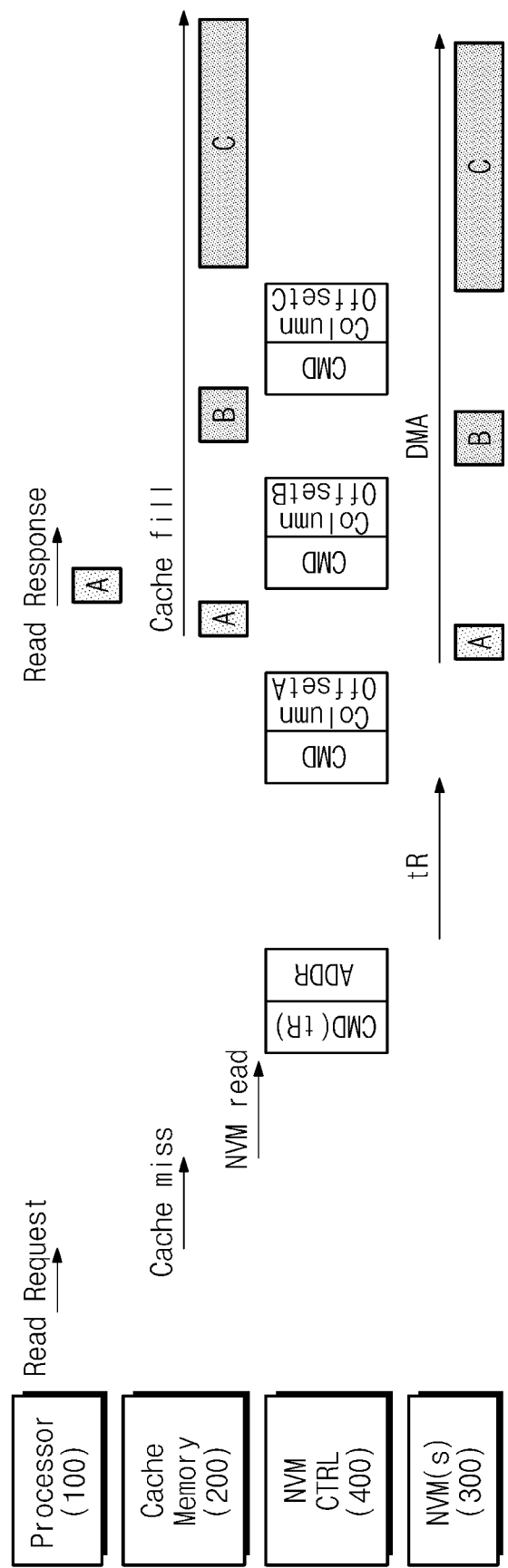
FIG. 5 is a timing diagram of a wraparound-based read operation when a cache miss is generated at a computing system, according to an embodiment of the disclosure.

FIG. 5 is a timing diagram of a wraparound-based read operation when a cache miss is generated at a computing system, according to an embodiment of the disclosure. Below, a read operation will be described with reference to FIG. 5. The processor 100 may issue a read request for reading the critical word "A". The cache memory 200 may determine a cache hit/cache miss in response to the read request. When the cache miss is generated, the memory controller 400 may perform a read operation with respect to a page of the nonvolatile memory 300 corresponding to the read request. The nonvolatile memory 300 may perform a page read operation in response to a wraparound read command CMD(tR) and an address ADDR. Data (C, A, B) including the critical word "A" are stored in the page buffer circuit 330 of the nonvolatile memory 300 as the result of the page read operation.

Afterwards, the memory controller 400 may fill the cache memory 200 with the critical word "A", which is stored in the page buffer circuit 330, in a direct memory access (DMA) manner by issuing an output command CMD and a column offset OffsetA to output data "A". Here, the column offset OffsetA is location information indicating the critical word "A" in page data C-A-B. When data is sent in the DMA manner, an error of data "A" may be corrected by the ECC 420 (refer to FIG. 2). When the error of the data "A" is completely corrected, the memory controller 400 may generate the output command CMD and the column offset OffsetB for the output of the data "B".

Also, when the critical word "A" is filled in a cache line of the cache memory 200, the cache memory 200 may respond to the read request by outputting the critical word "A" corresponding to the read request to the processor 100 without delay.

At the same time, the data "B" that is stored in the page buffer circuit 330 may be filled in the cache memory 200 in the DMA manner in response to the output command CMD and a column offset OffsetB that the memory controller 400 issues. When the error of the data "B" is completely corrected, the memory controller 400 may fill the data "C" stored in the page buffer circuit 330 into the cache memory 200 in the DMA manner by generating the output command CMD and a column offset OffsetC for the output of the data "C".

According to the wraparound scheme described with reference to FIG. 5, the output command CMD and the column offset OffsetB for the data "B" following the data "A" may be provided to the nonvolatile memory 300 after the critical word "A" is output. However, embodiments are not limited thereto. The nonvolatile memory 300 according to an embodiment may be implemented to output the data "B" following the critical data "A" without a separate output command.

Figure 6:
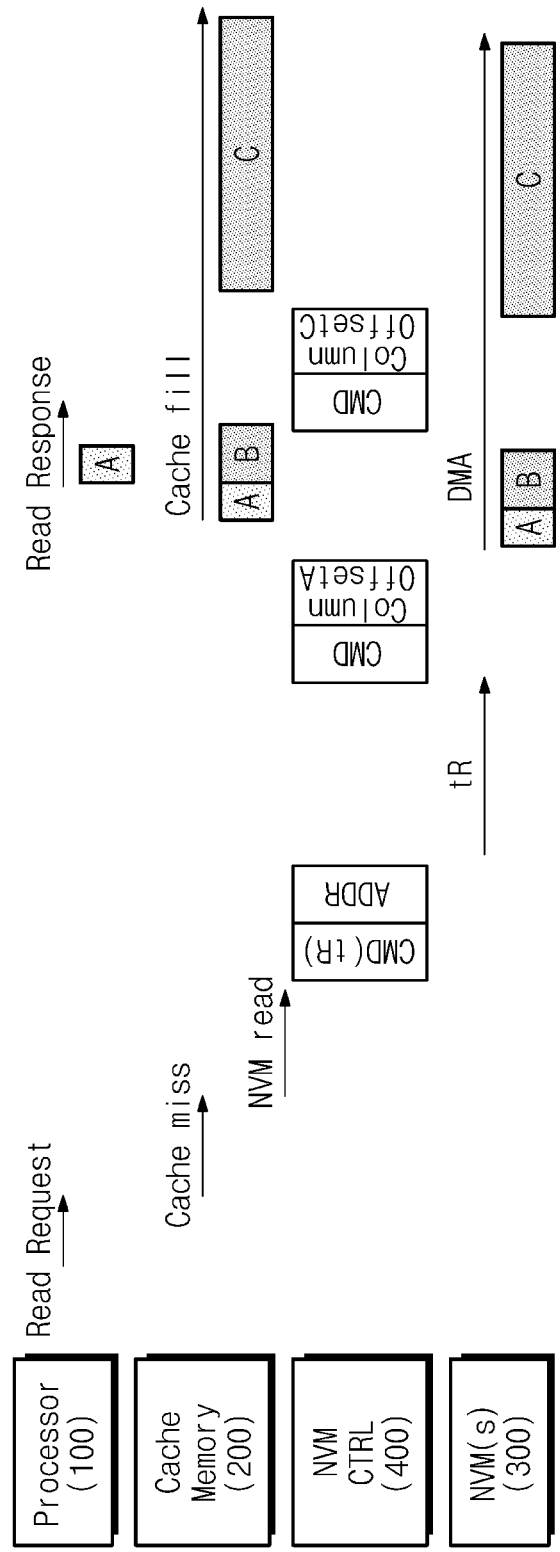
FIG. 6 is a timing diagram of a wraparound-based read operation when a cache miss is generated at a computing system, according to another embodiment of the disclosure.

FIG. 6 is a timing diagram of a wraparound-based read operation when a cache miss is generated at a computing system, according to another embodiment of the disclosure. A read operation of FIG. 6 is different from that of FIG. 5 in that a critical word "A" and data "B" following the critical word "A" are output together. Afterwards, data "C" may be output in response to the output command CMD and the column offset OffsetC.

Meanwhile, a wraparound-based read operation illustrated in FIGS. 5 and 6 may be performed in response to a plurality of output commands that the memory controller 400 issues. However, embodiments are not limited thereto. According to an embodiment of the disclosure, the wraparound-based read operation may be performed in response to a single output command.

Figure 7:
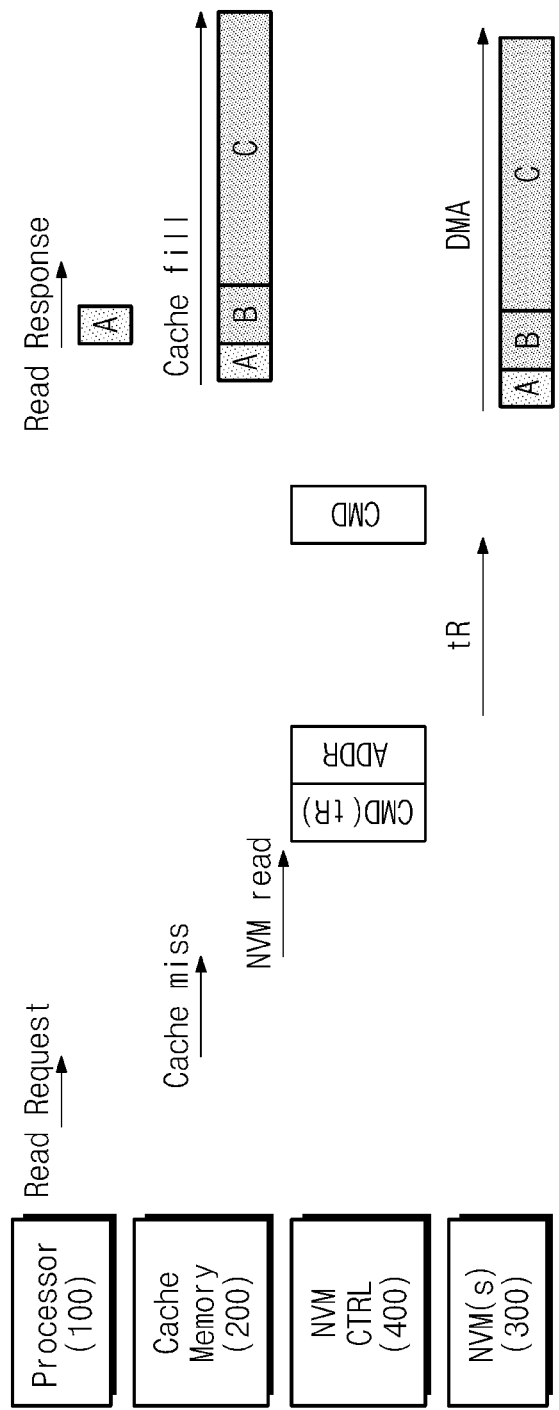
FIG. 7 is a timing diagram of a wraparound-based read operation when a cache miss is generated at a computing system, according to still another embodiment of the disclosure.

FIG. 7 is a timing diagram of a wraparound-based read operation when a cache miss is generated at a computing system, according to still another embodiment of the disclosure. A read operation of FIG. 7 is different from that of FIG. 5 or 6 in that the read operation is performed in response to a single output command. The single output command may include information of an offset location. The nonvolatile memory 300 may output page data of the page buffer circuit in the wraparound scheme in response to the single output command. Data "A", "B", and "C" that are output in the wraparound scheme may be sequentially error-corrected, and the sequentially error-corrected data "A", "B", and "C" may be sequentially filled in a cache line of the cache memory 200.

When the critical word "A" is filled in a cache line of the cache memory 200, the cache memory 200 may respond to the read request by outputting the critical word "A" to the processor 100 without delay.

Meanwhile, it should be understood that timing diagrams of FIGS. 5 to 7 are only exemplary. The computing system 10 according to an embodiment of the disclosure may perform a read operation from a column corresponding to a critical word first of all when the critical word exists during a page read operation of the nonvolatile memory 300. For example, in the case where a block size of a host is 64B and a page size of a nonvolatile memory is 16 KB, an offset of a memory block that the host requests may not be a first portion of page data. In this case, the computing system 10 according to an embodiment of the disclosure may perform a page read operation according to the following sequence: 1) read data from the offset of the memory block that the host requests, 2) read the remaining data.

Meanwhile, in FIGS. 2 to 7, errors of data "A", "B", and "C" output from the nonvolatile memory 300 may be corrected by the ECC 420 of the memory controller 400. However, embodiments are not limited thereto. The nonvolatile memory 300 may internally correct an error of data and may output the error-corrected data.

Figure 8:
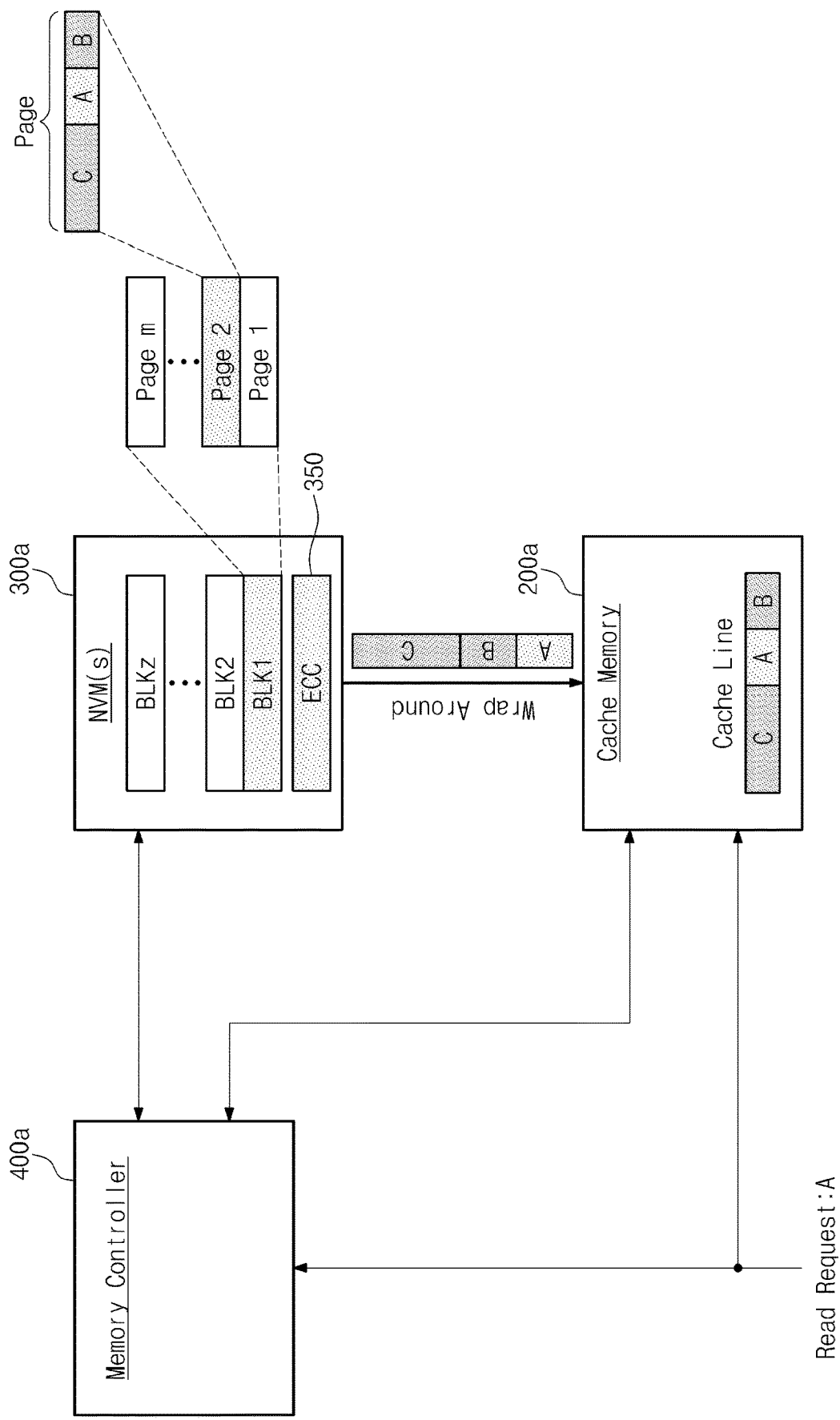
FIG. 8 is a view for describing a process of filling a cache line by using a wraparound scheme according to another embodiment of the disclosure.

FIG. 8 is a view for describing a process of filling a cache line by using a wraparound scheme according to another embodiment of the disclosure. Error correction of the cache line filling process of FIG. 8 may be performed at a location different from that of the cache line filling process of FIG. 2. As illustrated in FIG. 8, an error correction circuit 350 of the nonvolatile memory 300a may sequentially correct errors of pieces of data "A", "B", "C" corresponding to the wraparound scheme. The error-corrected data "A", "B", and "C" may be sent through a dedicated channel between the nonvolatile memory 300a and the cache memory 200a. When a tag determination result corresponding to a read request for the critical word "A" indicates that a cache miss is generated, the memory controller 400a may control the cache memory 200a and the nonvolatile memory 300a such that a cache line is filled according to the wraparound scheme.

Meanwhile, a wraparound operation of the nonvolatile memory 300a according to an embodiment of the disclosure may be variously performed with regard to a read latency tR. Various kinds of wraparound operations will be described with reference to FIGS. 9 to 11.

Figure 9:
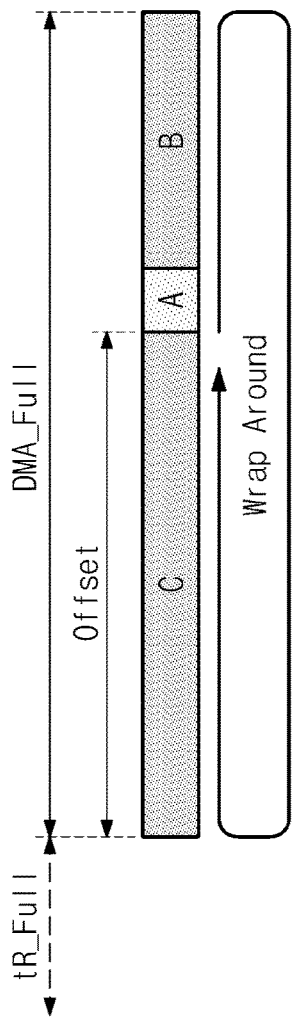
FIG. 9 is a view illustrating a wraparound operation of a nonvolatile memory according to an embodiment of the disclosure.

FIG. 9 is a view illustrating a wraparound operation of a nonvolatile memory according to an embodiment of the disclosure. Referring to FIG. 9, the wraparound operation may be divided into a read operation performed during a read latency tR_FULL corresponding to a full page and a DMA operation corresponding to the full page after the read operation.

The nonvolatile memory 300 may perform the wraparound operation by outputting data for a full-page DMA time DMA_Full in an order of "A", "B", and "C", in which the data "A" is a critical word indicated by the offset. In an embodiment, the DMA transmission time DMA_Full of the full-page may correspond to the time taken to send data of 16 KB.

Meanwhile, the time taken to perform the DMA operation of the wraparound operation need not be the same as the time taken to send page data. In an embodiment, the time taken to perform the DMA operation of the wraparound operation may be variously designated/determined at the nonvolatile memory 300 or the memory controller 400.

Figure 10:
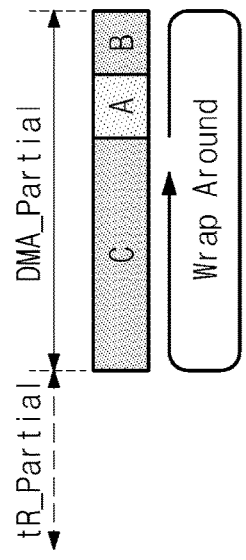
FIG. 10 is a view illustrating a wraparound operation of a nonvolatile memory according to another embodiment of the disclosure.

FIG. 10 is a view illustrating a wraparound operation of a nonvolatile memory according to another embodiment of the disclosure. Compared to the wraparound operation of FIG. 9, the wraparound operation of FIG. 10 may be divided into a read operation performed during a read latency tR_Partial corresponding to a partial page and a DMA operation corresponding to the partial page. In an embodiment, the DMA transmission time DMA_Partial of the partial page may correspond to the time taken to send 4 KB-data.

Figure 11:
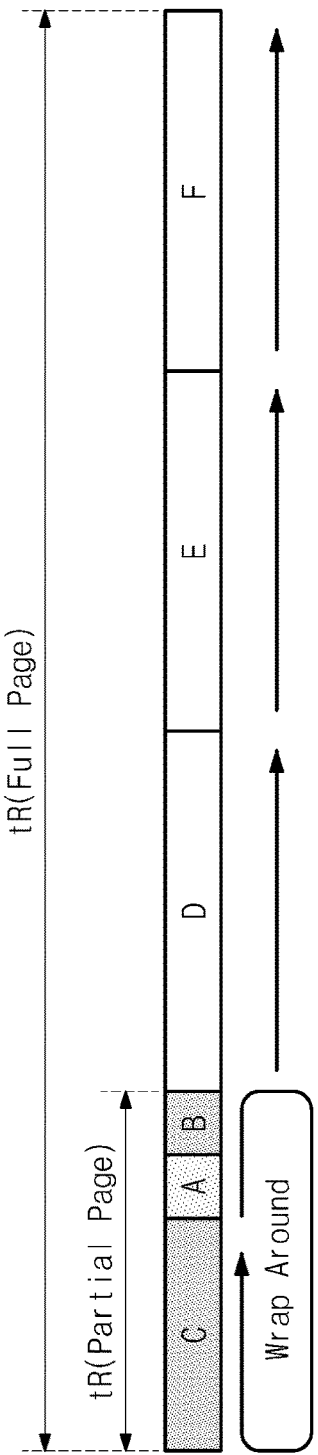
FIG. 11 is a view illustrating a wraparound operation of a nonvolatile memory according to still another embodiment of the disclosure.

FIG. 11 is a view illustrating a wraparound operation of a nonvolatile memory according to still another embodiment of the disclosure. Referring to FIG. 11, the wraparound operation may be performed only in a portion of the whole page. Data corresponding to the remaining portions may be output normally. The read latency for the portion of the whole page tR(Partial Page) and the read latency for the whole page tR(Full Page) are illustrated in FIG. 11 with respect to data portions A-F of the whole page.

Meanwhile, it should be understood that the wraparound operation described with reference to FIGS. 9 to 11 is only exemplary, not limited thereto. The time taken to perform the wraparound operation may be set at the nonvolatile memory 300 according to various methods.

Figure 12:
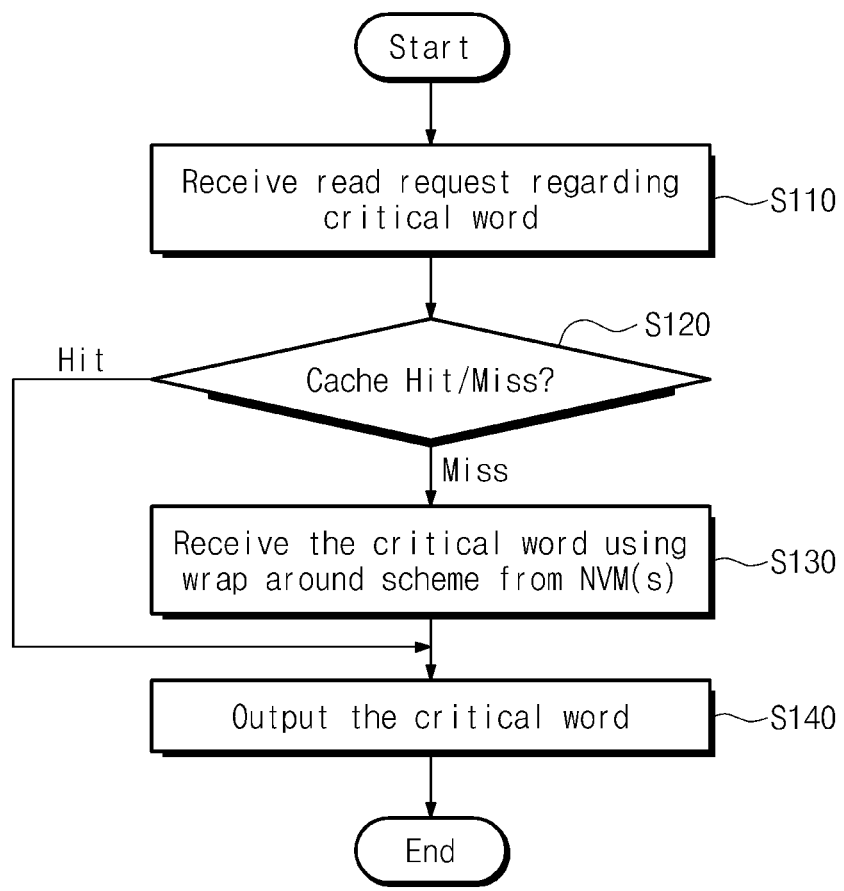
FIG. 12 is a flowchart illustrating a read method of a cache memory of a computing system according to an embodiment of the disclosure.

FIG. 12 is a flowchart illustrating a read method of a cache memory of a computing system according to an embodiment of the disclosure. Below, a read method of the cache memory 200 will be described with reference to FIG. 12. In operation S110, the cache memory 200 receives a read request regarding a critical word (e.g., "A") from the processor 100 of the host. In an embodiment, the size of the critical word "A" may be 64B. The cache memory 200 may determine S120 whether a cache hit or cache miss is generated with respect to a cache line corresponding to the read request, through a tag comparison operation. Meanwhile, it should be understood that there is no need for the cache memory 200 to determine a cache hit/miss. For example, the memory controller 400 (refer to FIG. 2) may determine S120 whether a cache hit/miss is generated and may provide the determination result to the cache memory 200.

If the cache hit is not generated with respect to the cache line corresponding to the read request, that is, if the cache miss is generated, in operation S130, the cache memory 300 may receive the critical word "A" from the nonvolatile memory 300 in the wraparound scheme described with reference to FIGS. 1 to 11. A cache line may be filled with the critical word "A" in the wraparound scheme. If receiving the critical word "A", in operation S140, the cache memory 200 may output the critical word "A" to the processor 100 without delay. If the cache hit is generated with respect to the cache request, the cache memory 200 may output S140 the critical word "A" included in the cache line corresponding to the read request to the processor 100.

The cache memory 200 and the nonvolatile memory 300 may be implemented with one memory module.

Figure 13:
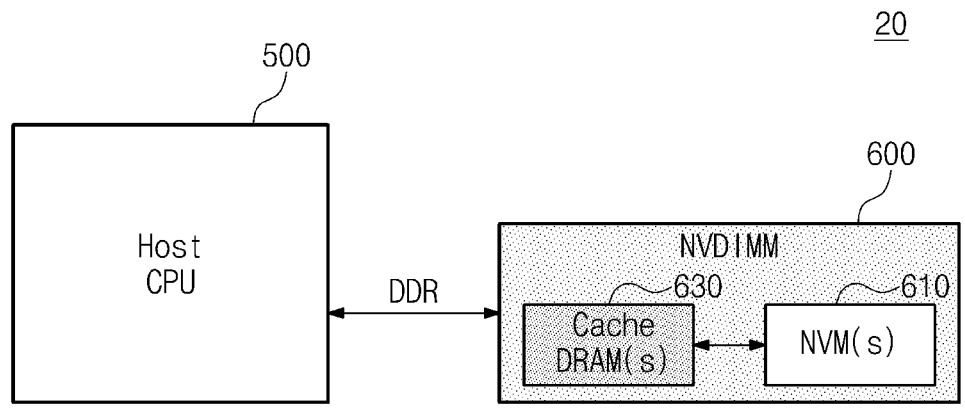
FIG. 13 is a view illustrating a computing system according to another embodiment of the disclosure.

FIG. 13 is a view illustrating a computing system 20 according to another embodiment of the disclosure. Referring to FIG. 13, the computing system 20 may include a host central processing unit (hereinafter referred to as a "CPU") 500 and a nonvolatile memory module (NVDIMM) 600.

The nonvolatile memory module 600 may be connected to the CPU 500 through a double data rate (DDR) interface. The nonvolatile memory module 600 of FIG. 12 may be connected to the CPU 500 according to the DDR interface. The nonvolatile memory module 600 may be connected to the CPU 500 through various kinds of communication interfaces other than the DDR interface.

Figure 14:
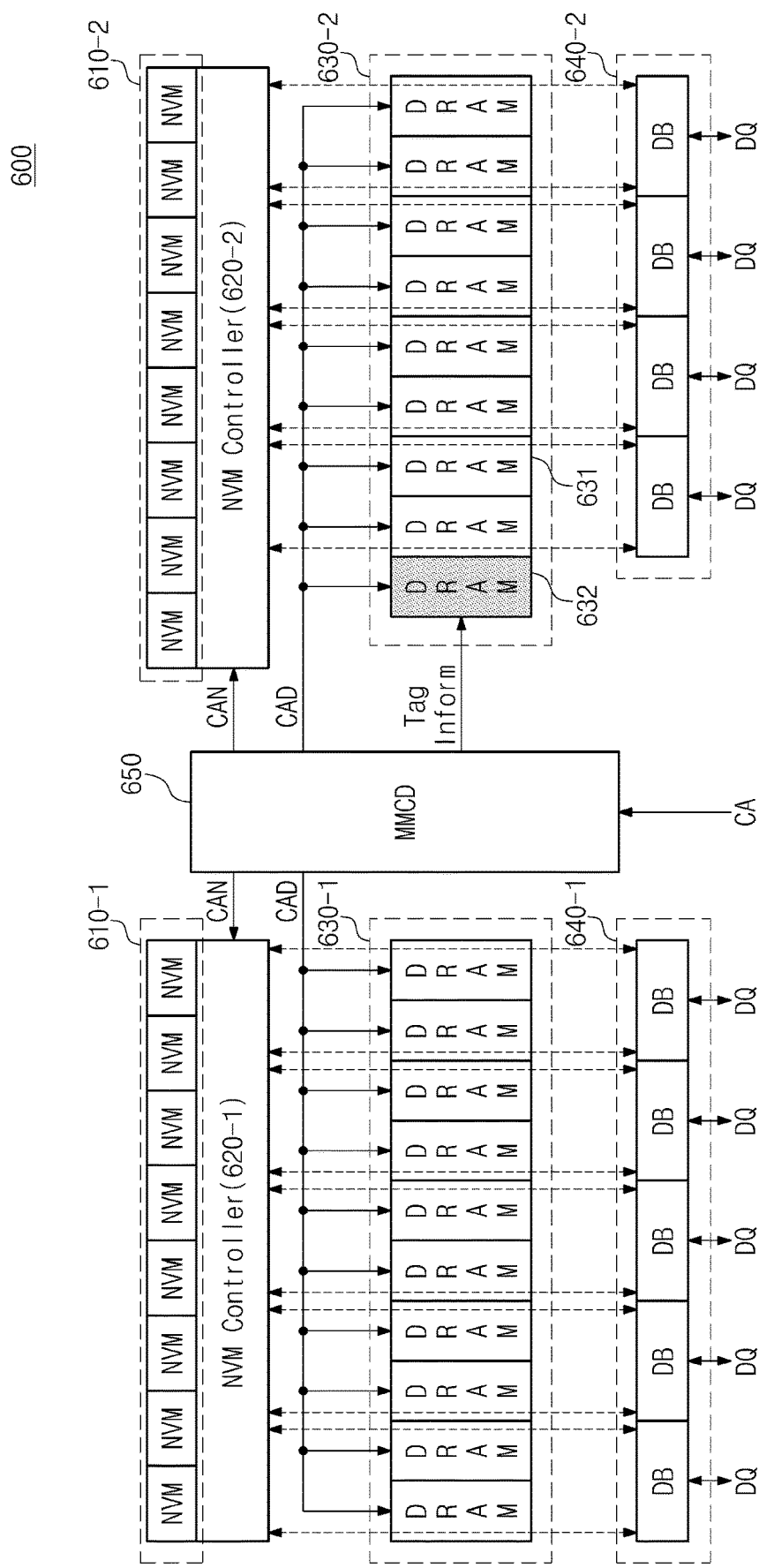
FIG. 14 is a block diagram illustrating a nonvolatile memory module illustrated in FIG. 13.

Also, the nonvolatile memory module 600 may be implemented with a dual in-line memory module. The nonvolatile memory module 600 may be used as a working memory (or operating memory) of the CPU 500. As illustrated in FIG. 14, the nonvolatile memory module 600 may include at least one nonvolatile memory 610 and at least one cache DRAM 630 performing a cache function thereof. The nonvolatile memory module 600 may read critical data from the nonvolatile memory 610 in the wraparound scheme and may fill the cache DRAM 630 with the read data. In other words, the nonvolatile memory module 600 may read a critical word first of all during a DMA process of a read operation of the nonvolatile memory 610, may send the read critical word to the host, and may load the remaining data on the cache DRAM 630 in the wraparound scheme.

The nonvolatile memory module 600 according to an embodiment of the disclosure may read data corresponding to an offset of the critical word and then may read the rest of page data in the wraparound scheme. Accordingly, it may be possible to prefetch the remaining data in a following read operation.

FIG. 14 is a block diagram illustrating a nonvolatile memory module of FIG. 13. Referring to FIG. 14, the nonvolatile memory module 600 may include nonvolatile memories (NVMs) 610-1 and 610-2, nonvolatile memory controllers 620-1 and 620-2, DRAMs 630-1 and 630-2, data buffers (DBs) 640-1 and 640-2, and a memory module control device (MMCD) 650. In the nonvolatile memory module 600 of FIG. 14, the first nonvolatile memory 610-1, the first nonvolatile memory controller 620-1, the first DRAM 630-1, and the first data buffer 640-1 may be disposed at the left with respect to the first the memory module control device 650, and the second nonvolatile memory 610-2, the second nonvolatile memory controller 620-2, the second DRAM 630-2, and the second data buffer 640-2 may be disposed at the right with respect to the first the memory module control device 650. Meanwhile, the arrangement of the above-described elements should be understood as not limiting embodiments of the disclosure.

The nonvolatile memory controllers 620-1 and 620-2 may be implemented to control operations of the nonvolatile memories 610-1 and 610-2 based on a first command/address CAN (or a nonvolatile memory command/address). Here, the first command/address CAN may be output from the memory module control device 650. The number of nonvolatile memories 610-1 and 610-2 of the nonvolatile memory module 600 is not limited to FIG. 13.

The DRAMs 630-1 and 630-2 may be implemented to perform an input/output operation (e.g., a write/read operation) based on a second command/address CAD (or a DRAM command/address). Each of the DRAMs 630-1 and 630-2 may be implemented with a dual-port DRAM. For example, each of the DRAMs 630-1 and 630-2 may have a first input/output port and a second input/output port. Here, each of the first input/output ports may be connected to a data path between the DRAM 610-1/610-2 and the nonvolatile memory controller 620-1/620-2, and each of the second input/output ports may be connected to a data path between the DRAM 610-1/610-2 and data buffers corresponding thereto. In an embodiment, the first input/output ports may output 4 bytes (or 32 bits), and the second input/output ports may output 4 bytes. Here, output data of the first and second input/output ports should be understood as not limiting embodiments of the disclosure.

At least one DRAM 632 of the DRAMs 630-1 to 630-2 may be implemented to store a tag corresponding to a cache and compare received tag information with the stored tag. The remaining DRAMs (e.g., DRAM 631) may be implemented to store cache data corresponding to the tag. Below, a DRAM storing a tag may be referred to as a "tag DRAM", and each of the remaining DRAMs may be referred to as a "data DRAM".

In an embodiment, the tag DRAM 632 may be implemented to store a tag of 4 bytes. In an embodiment, the tag DRAM 632 may be implemented to store a tag in a 2-way, 1:8 direct mapping scheme. Here, the tag may include location information about cache data stored in the data DRAMs 631 and dirty/clear information indicating validity of cache data. Meanwhile, the tag may include an error correction value for error correction. To this end, the tag DRAM 632 may include an error correction circuit for error correction.

Meanwhile, the tag DRAM 632 may not be limited to the 2-way and 1:8 direct mapping scheme. It should be understood that a way or mapping scheme of the tag DRAM 632 is determined according to various combinations.

In an embodiment, the tag DRAM 632 and the data DRAM 631 may be implemented with the same element. In another embodiment, the tag DRAM 632 and the data DRAM 631 may be implemented with different elements. The number of DRAMs 630-1 and 630-2 of the nonvolatile memory module 600 is not limited to FIG. 14.

The first and second data buffers 640-1 and 640-2 may be respectively connected to the DRAMs 630-1 and 630-2. The first and second data buffers 640-1 and 640-2 may be implemented to send data DQ received from the CPU 500 (refer to FIG. 12) to the DRAMs 630-1 and 630-2 or to send data DQ output from the DRAMs 630-1 and 630-2 to the CPU 500.

In an embodiment, the data buffers 640-1 and 640-2 may be implemented to be suitable for the DDR interface standard. For example, each of the data buffers 640-1 and 640-2 may be implemented to receive and output eight data signals and two data strobe signals. Although not illustrated in FIG.

14, each of the data buffers 640-1 and 640-2 may output data received from the CPU 500 to a DRAM corresponding thereto in response to a buffer command. In an embodiment, each of the data buffers 640-1 and 640-2 may be implemented with a first-in first-out (FIFO) memory or dual-port SRAM.

The memory module control device 650 may be implemented to control an overall operation of the nonvolatile memory module 600. The memory module control device 650 may control the nonvolatile memory controllers 620-1 and 620-2, the DRAMs 630-1 and 630-2, the data buffers (DBs) 640-1 and 640-2 so as to use the nonvolatile memory module 600 as a working memory (or operating memory). The memory module control device 650 may receive a command/address CA from the CPU 500 and may generate the first command/address CAN (or a nonvolatile memory command/address) or a second command/address CAD (or a DRAM command/address). The memory module control device 650 may be implemented to generate and manage a tag corresponding to a cache.

In FIG. 14, whether a cache hit/miss is generated may be determined by performing a tag comparison operation in the tag DRAM 632. However, embodiments are not limited thereto. Whether a cache hit/miss is generated may be performed at the memory module control device 650.

Figure 15:
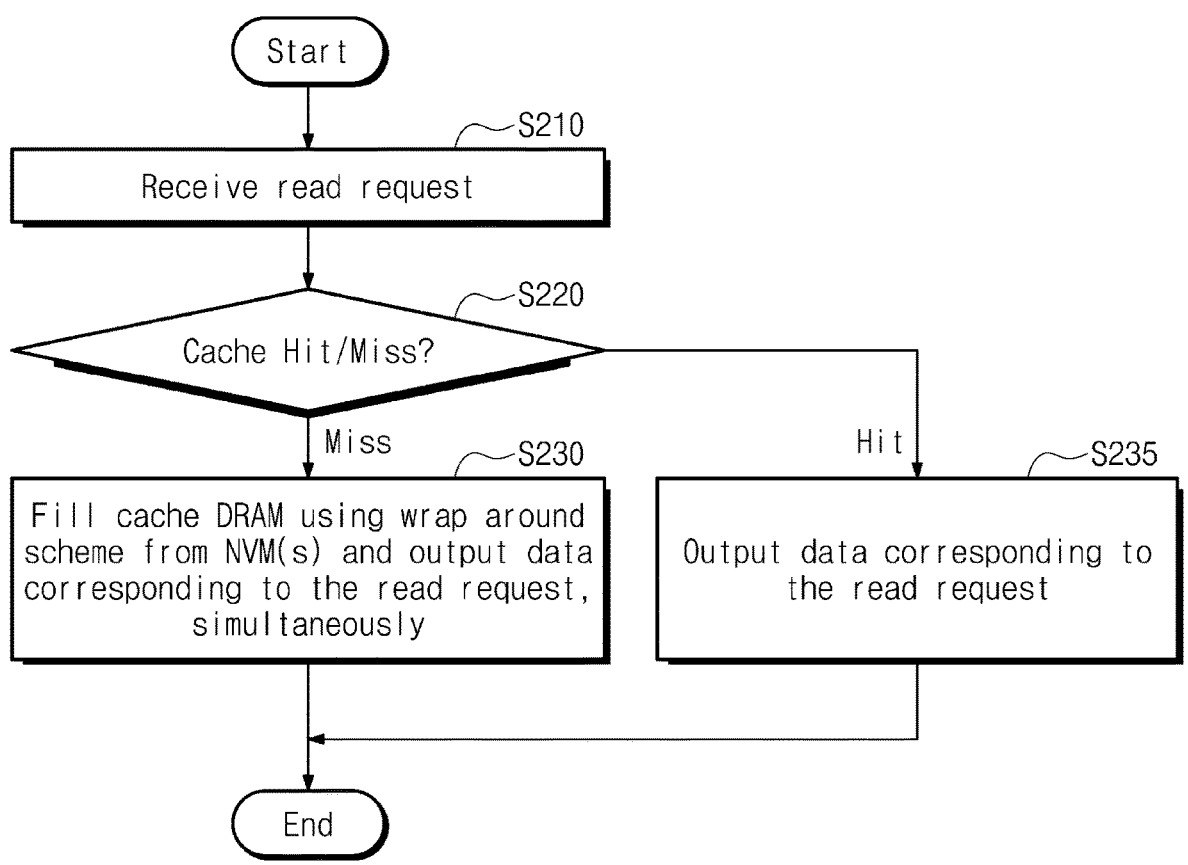
FIG. 15 is a flowchart illustrating a read method of a nonvolatile memory module according to an embodiment of the disclosure.

FIG. 15 is a flowchart illustrating a read method of a nonvolatile memory module according to an embodiment of the disclosure. A read method of the nonvolatile memory module 600 will be described with reference to FIGS. 13 to 15.

In operation S210, the nonvolatile memory module 600 may receive a read request corresponding to cache data from the CPU 500. In operation S220, a tag DRAM of the nonvolatile memory module 600 may determine whether a cache hit/miss is generated, by comparing a tag corresponding to the read request with a tag stored therein.

If the tag comparison result indicates that a cache miss is generated, the nonvolatile memory controllers 620-1 and 620-2 may read cache data corresponding to the read request from the nonvolatile memories 620-1 and 620-2 in the wraparound scheme and may fill S230 cache lines of data DRAMs with the read cache data. At the same time, in operation S230, the data DRAMs may output data corresponding to the read request, for example, a critical word (e.g., "A").

In contrast, if the tag comparison result indicates that a cache hit is generated, in operation S235, the data DRAMs may output the critical word "A" from a cache line corresponding to the read request.

Embodiments are exemplified in FIGS. 13 to 15 as the cache DRAM 630 is placed inside the nonvolatile memory module 600. However, embodiments are not limited thereto. For example, embodiments of the disclosure are applicable to a computing system in which DRAMs placed outside the nonvolatile memory module 600 are used as a cache.

Figure 16:
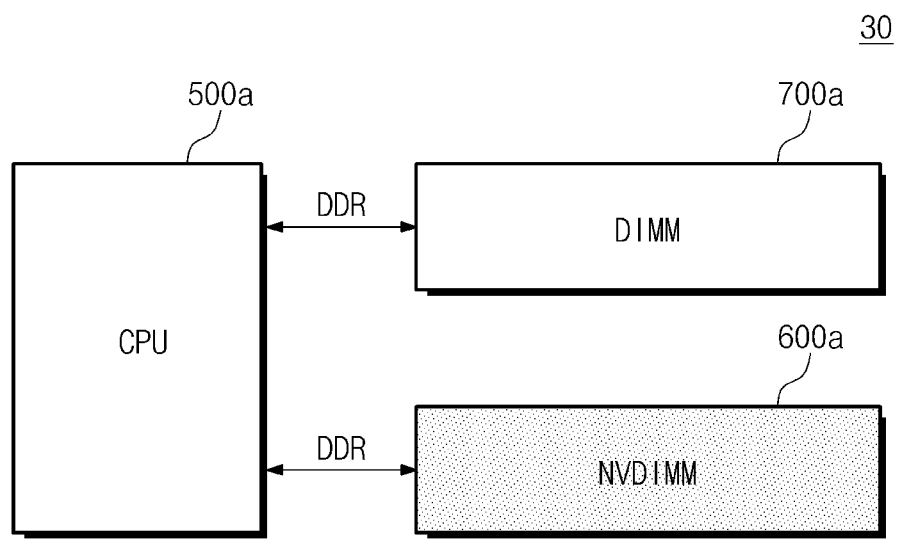
FIG. 16 is a block diagram illustrating a computing system according to still another embodiment of the disclosure.

FIG. 16 is a block diagram illustrating a computing system 30 according to still another embodiment of the disclosure. Referring to FIG. 16, the computing system 30 may include a CPU 500a, a nonvolatile memory module 600a (e.g., NVDIMM), and a volatile memory module 700a (e.g., DIMM). The nonvolatile memory module 600a and the volatile memory module 700a may be connected to the CPU 500a according to the DDR interface.

The nonvolatile memory module 600a may output cache data in the wraparound scheme as described with reference to FIGS. 1 to 15. The volatile memory module 700a may be implemented to perform a cache function of the nonvolatile memory module 600a. In particular, the volatile memory module 700a may include a plurality of cache lines. Here, each of the cache lines may be filled with cache data that is output from the nonvolatile memory module 600a in the wraparound scheme.

The nonvolatile memory module 600a and the volatile memory module 700a may be connected to the CPU 500a according to the DDRM interface. However, the scope and spirit of the disclosure may not be limited thereto.

Figure 17:
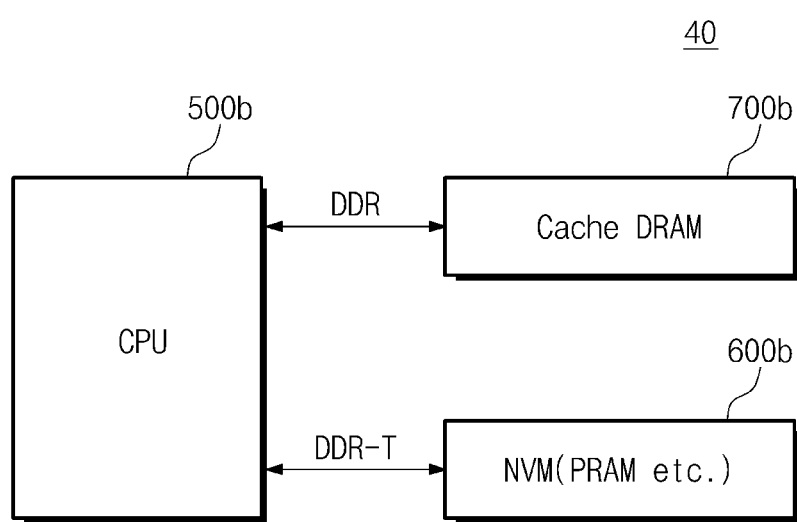
FIG. 17 is a block diagram illustrating a computing system according to still another embodiment of the disclosure.

FIG. 17 is a block diagram illustrating a computing system 40 according to still another embodiment of the disclosure. Referring to FIG. 17, the computing system 40 may include a CPU 500b, a nonvolatile memory 600b, and a cache DRAM 700b.

The nonvolatile memory 600b may be connected to the CPU 500b according to a DDR-transaction (DDR-T) interface. In an embodiment, the nonvolatile memory 600b may be implemented with, for example, a phase-change random access memory (PRAM). An internal read unit of the nonvolatile memory 600b may be a page unit. The nonvolatile memory 600b may be implemented to perform the wraparound operation described with reference to FIGS. 1 to 15. The cache DRAM 700b may be connected to the CPU 500b according to the DDR interface. The cache DRAM 700b may be implemented to perform a cache function of the nonvolatile memory 600b.

An embodiment is exemplified in FIG. 17 in which the cache DRAM 700b exists outside the CPU 500b. However, embodiments are not limited thereto. A cache DRAM may exist inside a central processing unit.

Figure 18:
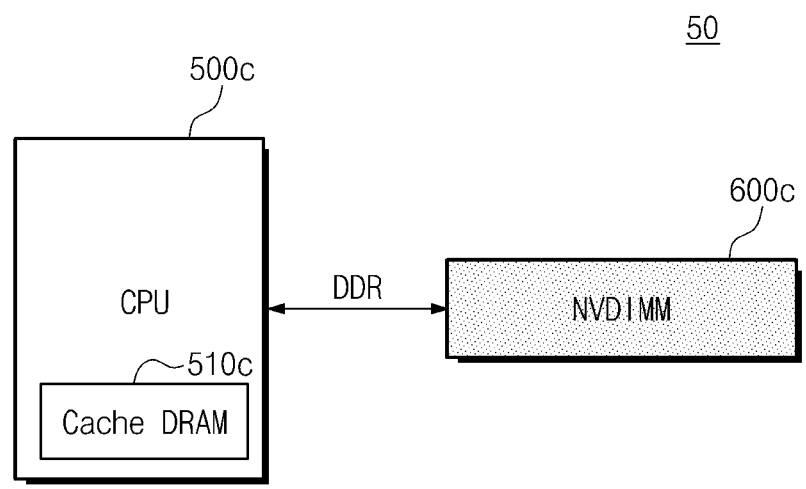
FIG. 18 is a block diagram illustrating a computing system according to still another embodiment of the disclosure.

FIG. 18 is a block diagram illustrating a computing system 50 according to still another embodiment of the disclosure. Referring to FIG. 18, a computing system 50 may include a CPU 500c and a nonvolatile memory module 600c (e.g., NVDIMM). The CPU 500c may include a cache DRAM 510c that performs a cache function of the nonvolatile memory module 600c.

The nonvolatile memory module 600c may be connected to the CPU 500c according to the DDR interface. The nonvolatile memory module 600c may be implemented to perform the wraparound operation described with reference to FIGS. 1 to 15.

Figure 19:
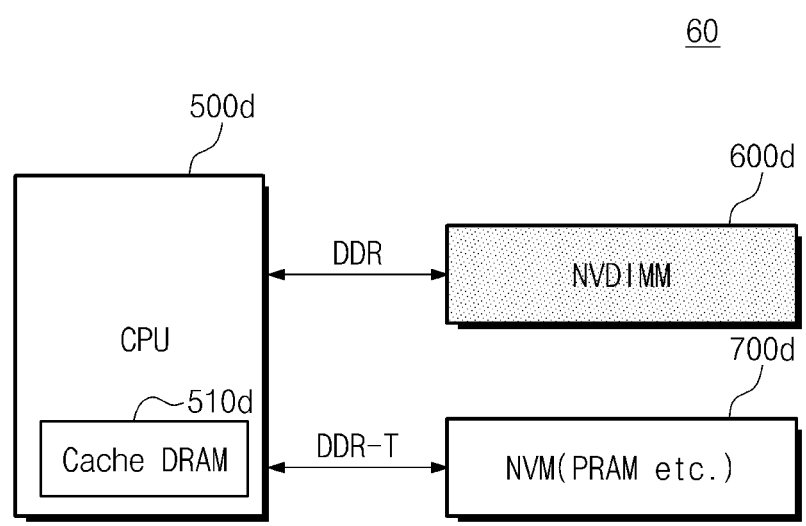
FIG. 19 is a block diagram illustrating a computing system according to still another embodiment of the disclosure.

FIG. 19 is a block diagram illustrating a computing system 60 according to still another embodiment of the disclosure. Compared to the computing system 50 of FIG. 18, the computing system 60 of FIG. 19 may further include a nonvolatile memory 700d that is connected to a CPU 500d according to the DDR-T interface. The cache DRAM 510d may be implemented to perform a cache function of the nonvolatile memory module 600d or the nonvolatile memory 700d. At least one of the nonvolatile memory module 600d and the nonvolatile memory 700d may be implemented to output data according to the wraparound scheme.

Meanwhile, a computing system according to an embodiment of the disclosure may be connected to various kinds of storage devices.

Figure 20:
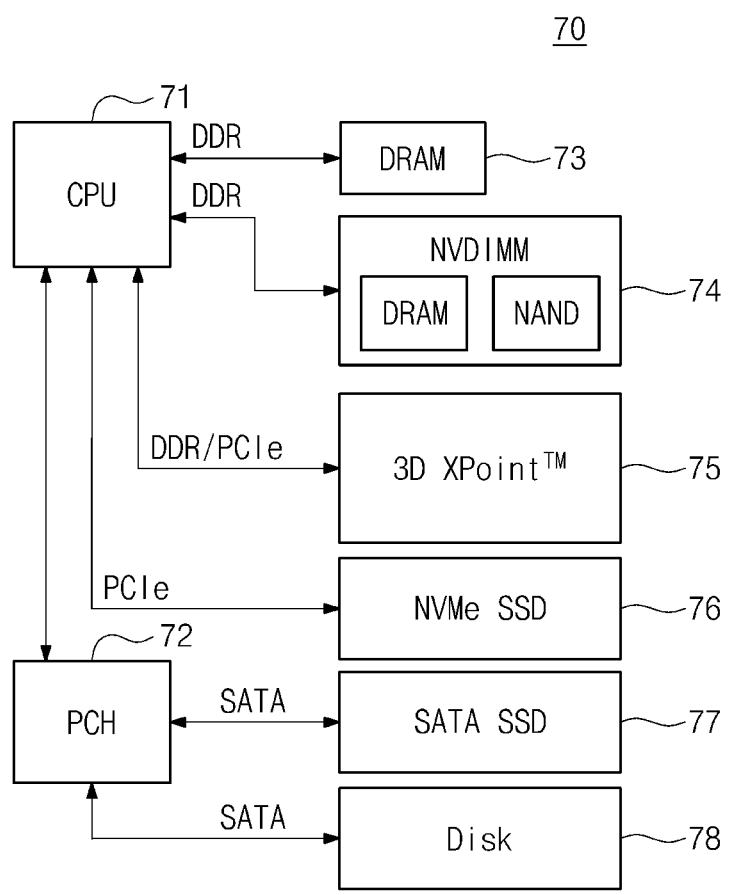
FIG. 20 is a view illustrating a computing system according to an embodiment of the disclosure.

FIG. 20 is a block diagram illustrating a computing system according to an embodiment of the disclosure. Referring to FIG. 20, a computing system 70 may include a CPU 71, a platform controller hub (PCH) 72, a DRAM 73, an NVDIMM 74, a three-dimensional (3D) Xpoint memory 75, an NVM express (NVMe) solid state drive (SSD) 76, a Serial AT attachment (SATA) SSD 77, and a disk 78. An embodiment is exemplified in FIG. 20 in which various kinds of storage devices are connected to the CPU 71. The computing system 70 according to an embodiment of the disclosure may be composed of at least one, which includes a nonvolatile memory used as a working memory, from among the storage devices 73 to 78 of FIG. 19 and the CPU 71.

The DRAM 73 and the NVDIMM 74 may communicate with the CPU 71 according to the DDR protocol. The 3D Xpoint memory 75 may communicate with the CPU 71 according to the DDR/PCIe or DDR-T/PCIe protocol. The NVMe SSD 76 may communicate with the CPU 71 according to the PCIe protocol. The platform controller hub 72 may be connected with storage devices according to various interfaces. For example, the SATA SSD 77 may be connected to the platform controller hub 72 by using the SATA interface. The disk 78 may be connected to the platform controller hub 72 by using the SATA interface.

Meanwhile, the computing system according to an embodiment of the disclosure may be applicable to a data server system.

Figure 21:
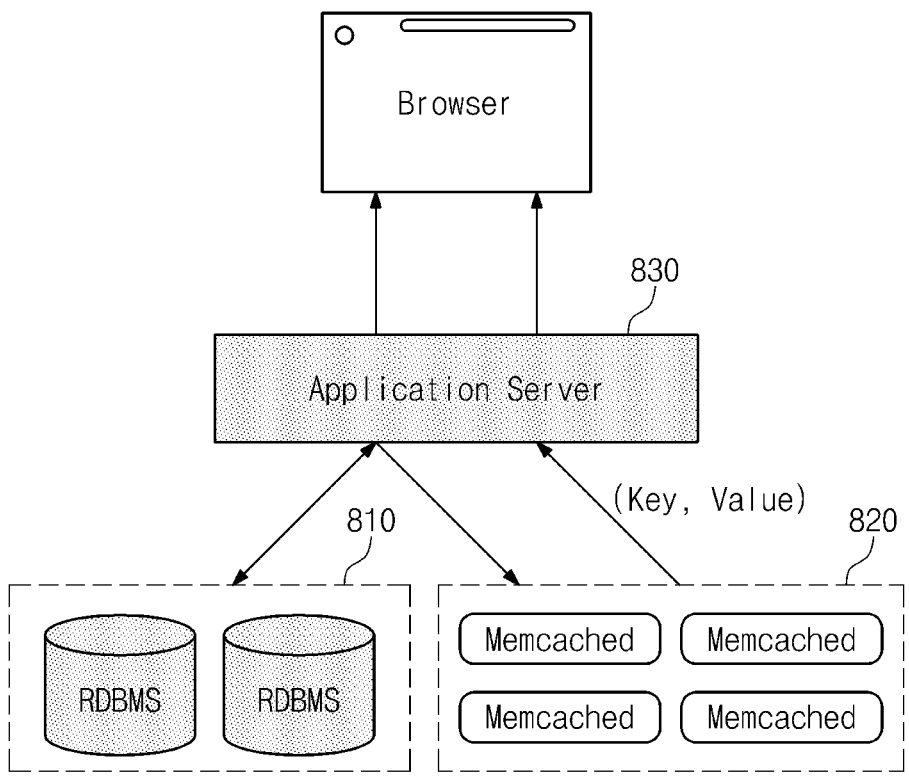
FIG. 21 is a view illustrating a data server system according to another embodiment of the disclosure.

FIG. 21 is a block diagram illustrating a data server system 80 according to another embodiment of the disclosure. Referring to FIG. 21, the data server system 80 may include a related database management system (RDBMS) 810, a cache server 820, and an application server 830.

The cache server 820 may include storing a key and value for maintaining and deleting different key-value pairs in response to an invalidation notification from the RDBMS 810. At least one of the RDBMS 810, the cache server 820, and the application server 830 may include a computing system that includes a nonvolatile memory outputting data in the wraparound scheme described with reference to FIGS. 1 to 20.

Meanwhile, embodiments of the disclosure may be applicable to any kind of computing system that uses a DRAM as a cache of a nonvolatile memory.

Figure 22:
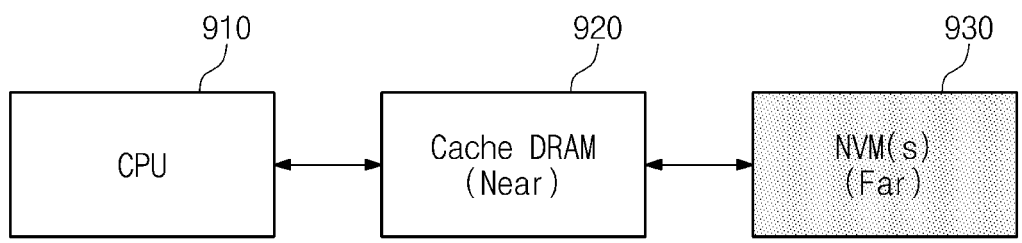
FIG. 22 is a view illustrating a computing system according to an embodiment of the disclosure.

FIG. 22 is a block diagram illustrating a computing system 90 according to an embodiment of the disclosure. Referring to FIG. 22, the computing system 90 may include a CPU 910, a cache DRAM 920, and at least one nonvolatile memory 930. The cache DRAM 920 may be implemented to perform a cache function of the at least one nonvolatile memory 930. In an embodiment, the cache DRAM 920 may be implemented with a dual-port memory. The cache DRAM 920 may be referred to as a "near memory" because it is relatively close to the CPU 910, and the nonvolatile memory 930 may be referred to as a "far memory" because it is relatively distant from the CPU 910 compared to the cache DRAM 920.

Meanwhile, a computing system according to an embodiment of the disclosure may be applicable to Internet of things (IoT) products.

Figure 23:
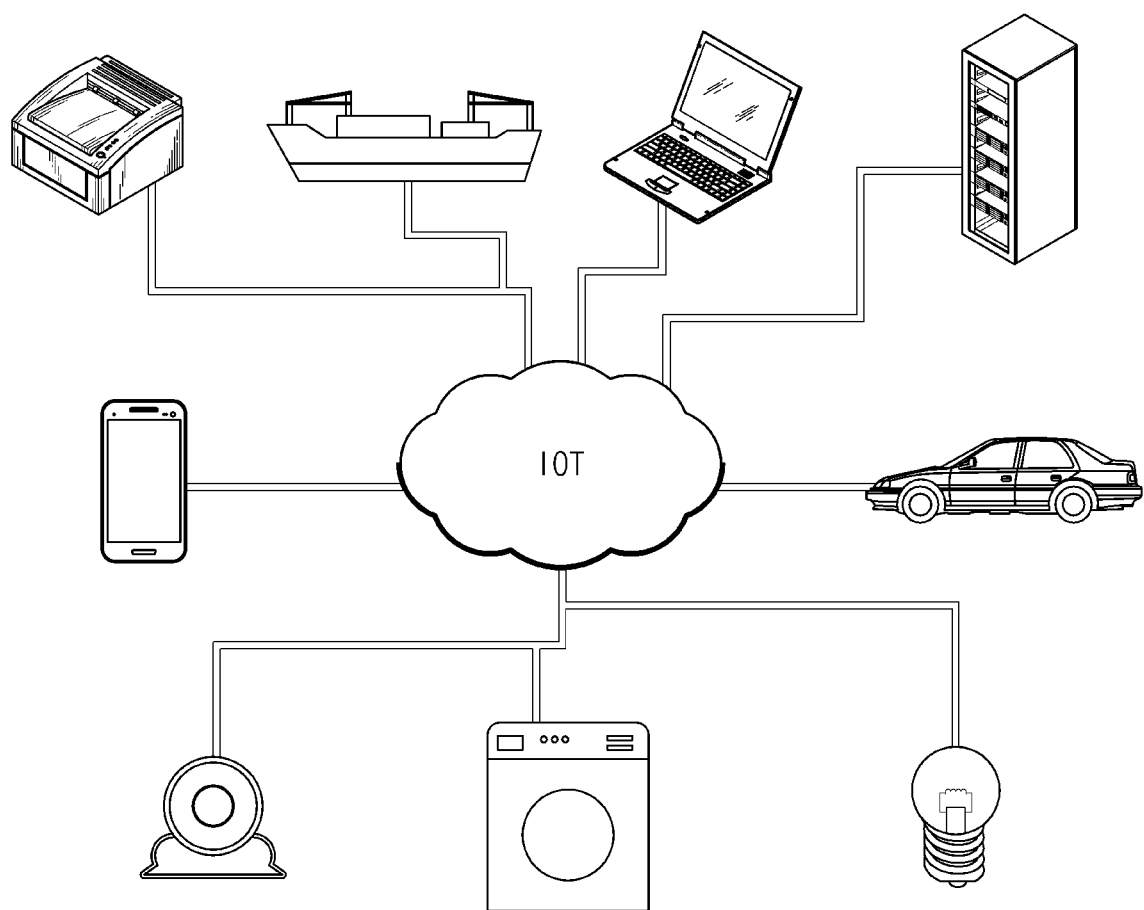
FIG. 23 is a view illustrating an IoT system implemented using a computing system according to an embodiment of the disclosure.

FIG. 23 is a block diagram illustrating an IoT system implemented using a computing system according to an embodiment of the disclosure. Referring to FIG. 23, the IoT system may include various IoT products connected over the Internet.

Each of the IoT products may have an accessible wired/wireless interface and may include devices that sends or receives data to or from at least one or more other devices through the wired/wireless interface. The accessible wired/wireless interface may include the following accessible modem communication interfaces that connect to wireless local area networks (WLANs): a local area network (LAN) and a wireless fidelity (Wi-Fi), wireless personal area networks (WPAN) such as Bluetooth, a wireless universal serial bus (USB), a ZigBee, a near field communication (NFC), a radio-frequency identification (RFID), a power line communication (PLC), or mobile cellular networks such as 3G (3rd generation), 4G (4th generation), and LTE (long term evolution). The Bluetooth interface may support BLE (Bluetooth low energy).

At least one of the IoT products may be implemented by at least one of the computing systems 10 to 90 described with reference to FIGS. 1 to 22.

A computing system and a read method thereof according to embodiments of the disclosure may improve read performance with respect to a critical word by filling a cache line in a wraparound read scheme when a cache miss is generated at a read request for the critical word and outputting the critical word immediately when the cache line is filled with the critical word.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to exemplary embodiments, it will be apparent to those skilled in the art that various changes and modifications may be made without departing from the spirit and scope of the disclosure. Therefore, it should be understood that the above embodiments are not limiting, but illustrative.

What is claimed is:

1. A read method executed by a computing system that comprises a processor, a nonvolatile memory, and a cache memory performing a cache function of the nonvolatile memory, the method comprising:
    receiving a read request regarding a critical word from the processor;
    determining whether a cache miss is generated, through a tag determination operation corresponding to the read request;
    receiving, in the cache memory, page data corresponding to the read request from the nonvolatile memory in response to a result of the tag determination operation indicating that the cache miss is generated, wherein receiving the page data comprises:
        receiving the critical word identified by the read request,
        receiving, after receiving the critical word, successor words that follow the critical word within the page data, and
        receiving, after receiving the successor words, preceding words that precede the critical word within the page data; and
    outputting the critical word to the processor in response to receiving the critical word of the page data.

2. The method of claim 1, wherein the tag determination operation is performed by the cache memory.

3. The method of claim 1, wherein:
the computing system further comprises a memory controller that controls the nonvolatile memory and the cache memory, and
the tag determination operation is performed by the memory controller.

4. The method of claim 1, further comprising outputting the critical word corresponding to the read request in response to the result of the tag determination operation indicating that a cache hit is generated.

5. The method of claim 1, wherein the computing system further comprises a memory controller configured to manage a tag for performing the cache function and control the nonvolatile memory and the cache memory.

6. The method of claim 5, further comprising performing an error correction operation with respect to the page data before receiving the page data.

7. The method of claim 6, wherein the error correction operation is performed by the memory controller.

8. The method of claim 6, wherein the error correction operation is performed by the nonvolatile memory.

9. The method of claim 5, wherein the receiving of the page data comprises:
receiving the critical word of the page data in response to a first output command;
receiving the successor words of the page data in response to a second output command after a predetermined time elapses from the receiving of the critical word; and
receiving the preceding words of the page data in response to a third output command, wherein
each of the first output command, the second output command, and the third output command is a different command.

10. The method of claim 5, wherein the receiving of the page data comprises sequentially receiving the critical word and the successor words of the page data in response to a single output command.

11. The method of claim 1, wherein the receiving of the page data comprises filling a cache line of the cache memory with the entirety of the page data during a full-page direct memory access (DMA) transmission time.

12. The method of claim 1, wherein the receiving of the page data comprises filling a cache line of the cache memory with the page data for a partial-page DMA transmission time.

13. The method of claim 1, wherein the receiving of the page data comprises:
filling a cache line of the cache memory with a partial page output from the nonvolatile memory in a wraparound scheme; and
filling the cache line of the cache memory with the rest of the page data except the partial page in a scheme different from the wraparound scheme.

14. The method of claim 1, wherein a unit of the critical word is an integer multiple of an error correction unit.

15. A read method executed by a nonvolatile memory module that comprises a nonvolatile memory and a dynamic random access memory (DRAM) performing a cache function of the nonvolatile memory, the method comprising:
receiving a read request from a host;
determining a cache hit or a cache miss of a cache line of the DRAM corresponding to the read request;
filling the cache line with page data, which is output from the nonvolatile memory and which corresponds to the read request, in response to determining the cache miss of the cache line, wherein filling the cache line comprises:
receiving, in the cache line, a critical word identified by the read request,
receiving, in the cache line after receiving the critical word, successor words that follow the critical word within the page data, and
receiving, in the cache line after receiving the successor words, preceding words that precede the critical word within the page data; and
outputting the critical word corresponding to the read request while filling the cache line with the page data.

16. The method of claim 15, wherein filling the cache line is performed during a read latency of the nonvolatile memory.

17. The method of claim 15, wherein the filling of the cache line comprises:
reading the page data from the nonvolatile memory in response to a wraparound read command;
filling the cache line with the critical word of the page data in response to a first output command and a first offset; and
filling the cache line with the successor words of the page data in response to a second output command and a second offset.

18. The method of claim 15, wherein the filling of the cache line comprises:
reading the page data from the nonvolatile memory in response to a wraparound read command; and
filling the cache line with the page data sequentially wrapped from the critical word in response to an output command.

19. The method of claim 15, wherein the filling of the cache line comprises:
correcting an error of the critical word; and
correcting an error of data of the page data which is not the critical word.

* * * * *